United States Patent [19]

Herbert

[11] Patent Number: 4,681,030
[45] Date of Patent: Jul. 21, 1987

[54] APPARATUS FOR PREPARING FROZEN DRINKS

[76] Inventor: John M. Herbert, 351 Normandy Dr., Norwood, Mass. 02062

[21] Appl. No.: 831,656

[22] Filed: Feb. 20, 1986

[51] Int. Cl.$^4$ .......................... A23G 9/00; B01F 15/06
[52] U.S. Cl. ......................................... 99/484; 62/331; 99/486; 366/144; 366/601
[58] Field of Search ................. 99/484, 275, 357, 486, 99/468, 290, 280, 323.7, 485; 366/144, 601, 205, 314; 62/331, 342; 426/249

[56] References Cited

U.S. PATENT DOCUMENTS

| | | | |
|---|---|---|---|
| 2,775,877 | 1/1957 | Bruntjen | 366/144 |
| 3,276,633 | 10/1966 | Rahauser | 62/342 |
| 4,528,824 | 7/1985 | Herbert | 99/484 |
| 4,538,509 | 9/1985 | Ojima | 366/144 |
| 4,551,025 | 11/1985 | Ames | 366/144 |

Primary Examiner—Robert W. Jenkins
Attorney, Agent, or Firm—Wolf, Greenfield & Sacks

[57] ABSTRACT

An apparatus for preparing frozen drinks, in which an ice-shaving machine is combined with a blender in a single unit, the output of the ice-shaving machine being discharged directly into the blender cup. The ice-shaver and the blender are electrically wired together, and programmable timing means are provided to permit selective control of the periods of time over which the ice-shaver and blender operate, so that, by the momentary activation of a single switch button, the apparatus may be activated and will automatically deliver the appropriate amount of ice to the blender cup and will turn on the blender at the appropriate time and for the appropriate amount of time.

8 Claims, 9 Drawing Figures

APPARATUS FOR PREPARING FROZEN DRINKS

FIELD OF THE INVENTION

This invention relates to apparatus for preparing frozen drinks, such as frozen soft drinks and cocktails, that consist of finely-divided ice, flavoring and other ingredients.

BACKGROUND OF THE INVENTION

In recent years, the popularity of "frozen drinks" has been increasing dramatically. These drinks typically consist of a mixture of flavorings, liquor and/or other ingredients and a finely-divided ice/water mixture that has the consistency of a thin paste. This type of drink is often called a "slush" drink because the consistency of the drink resembles its namesake in both viscosity and texture.

Conventionally, a frozen drink is made by placing the ingredients of the drink, including ice in the form of cubes or crushed ice, in a blender. The blender is then operated for the considerable amount of time required to reduce the ice to a finely-divided state. The mixture is then transferred to a drinking glass for consumption.

One of the principal problems with the usual method of making frozen drinks is that start-up of the motor under peak load conditions —i.e., with the blender filled with ice and other ingredients—often causes damage to the blender motor, requiring rebuilding or replacement of the motor unit. Such repair must normally be carried out at an electrical motor service company, depriving the bar or restaurant of the use of the blender while involving significant expense.

A further problem associated with the conventional method arises from the amount of time consumed while the blender pulverizes the ice in the drink, reducing the number of customers that can be served within a given time period. Finally, use of ice cubes or chopped ice causes the blender to make a great deal of noise while reducing the ice to a more liquid state.

The invention described in U.S. Pat. No. 4,528,824 successfully addresses these problems. However, the instant invention represents an improvement over that device in that it makes frozen drinks even more efficiently, freeing even more time for the bartender or other operator to engage in other profitable activities.

It is therefore an object of the present invention to provide apparatus which can make frozen drinks quickly and efficiently.

It is another object of the present invention to provide apparatus which can make frozen drinks without frequent breakdown of the blender motor.

It is yet another object of the present invention to provide apparatus which can make frozen drinks more rapidly, and preferably more quietly, than conventional blenders.

It is still another object of the present invention to provide apparatus that will minimize the amount of time required of the operator in preparing a frozen drink.

SUMMARY OF THE INVENTION

The foregoing objects are achieved and the foregoing problems are solved by one illustrative embodiment of the invention in which an ice-shaving apparatus is combined with a blender in a single unit. The output of the ice-shaving apparatus discharges directly into the blender cup, in which there has been added a pre-measured amount of other drink ingredients (liquor, water, fruit, etc.). The ice-shaver and the blender are preferably electrically wired together in such a way that the blender automatically turns on a short time after the ice-shaver is turned on, and thus after some amount of shaved ice has been delivered to the blender cup. Programmable timing means are provided to permit selective control of the periods of time over which the ice-shaver and blender operate, so that, by the momentary activation of a single switch button, the apparatus may be activated and will automatically deliver the appropriate amount of ice to the blender cup and will turn on the blender at the appropriate time and for the appropriate amount of time. A sealed drainage deck is also affixed to the blender to prevent damage to the blender motor by liquids and spilled ice.

Incorporation of the ice-shaver and blender in a single unit serves to minimize the time required to make a frozen drink by reducing the required body movements of the bartender to a minimum number. The gradual dispensing of the shaved ice into the blender cup allows the blender motor to start up under a less than full load, thereby decreasing the wear and tear on the blender motor and greatly reducing the frequency of blender breakdown. Furthermore, because the slush is added gradually to the other ingredients, a more thorough and quicker blending of the product is achieved. And by programming the timing means, the ice shaver can be made to begin delivery of ice to the blender cup prior to activation of the blender, to avoid "fly up" of the ingredients in the blender.

A further important feature of the subject invention is the significant saving of time in the preparation of frozen drinks that it affords. By reducing the number of steps required, and minimizing the physical movements required, the subject invention allows a bartender to be much more productive, resulting in increased profits for the bar or restaurant.

DETAILED DESCRIPTION OF THE PREFERRED EMBODIMENT

Figure 1:
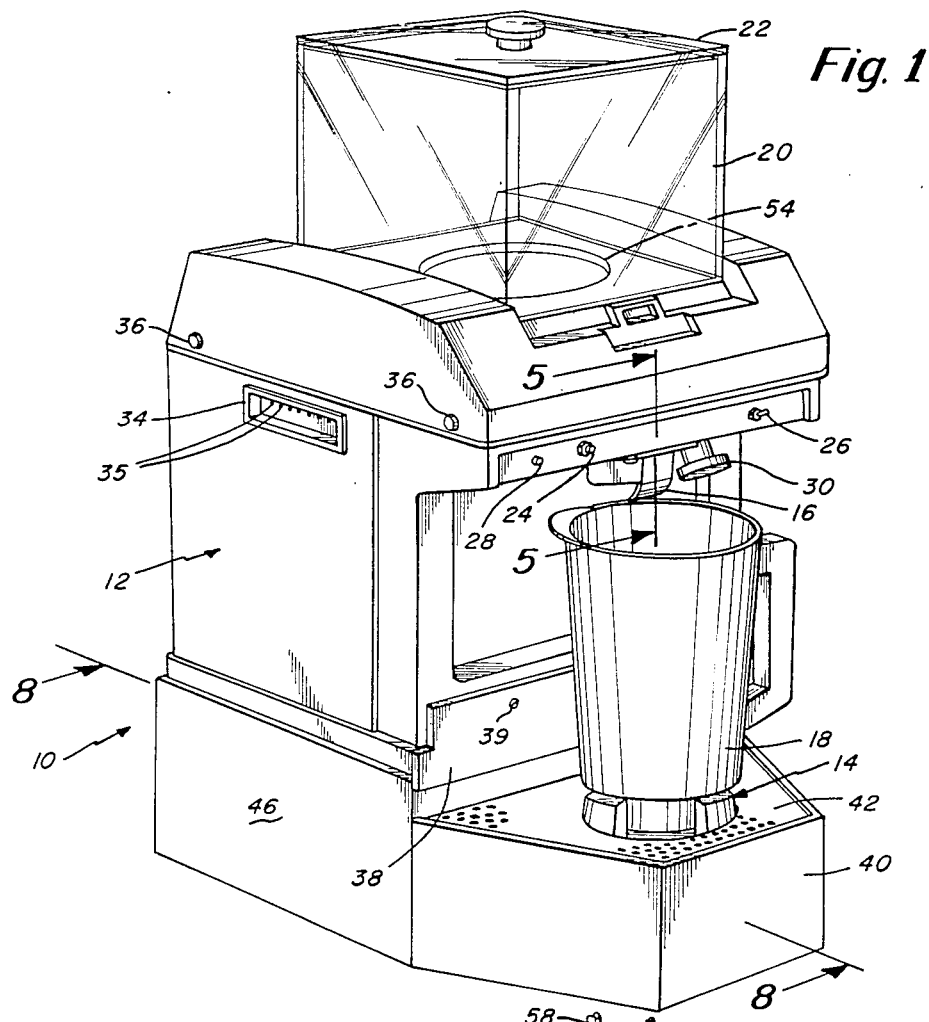
FIG. 1 is a perspective view of the preferred embodiment of the instant invention, showing the ice-shaving machine and blender combined in a single unit.

FIG. 1 shows an overall perspective view of the preferred embodiment of the frozen drink apparatus 10 of the present invention. The apparatus consists of an ice-shaver machine 12 and a blender unit 14. An ice-shaver machine suitable for use with the illustrative embodiment is the Hatsuyuki Ice Shaver, Model HC-8E, manufactured by Chubu Industries, Inc. of Kuwana, Mie, Japan. Other machines, including the Model 450 ice making machine of Taylor Freezer Co. of Rocton, Ill., could also be employed; that machine delivers ice/slush rather than shaved ice. However, the texture of the frozen drinks made with shaved ice is somewhat smoother and more appealing, and therefore the ice-shaver machine is often preferred.

Figure 5:
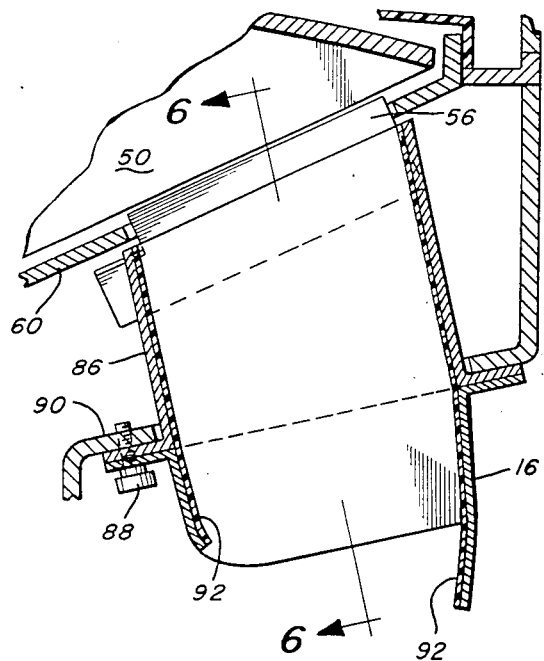
FIG. 5 is a cross-sectional view of the discharge port of the apparatus, as seen along the line 5—5 of FIG. 1.
Figure 6:
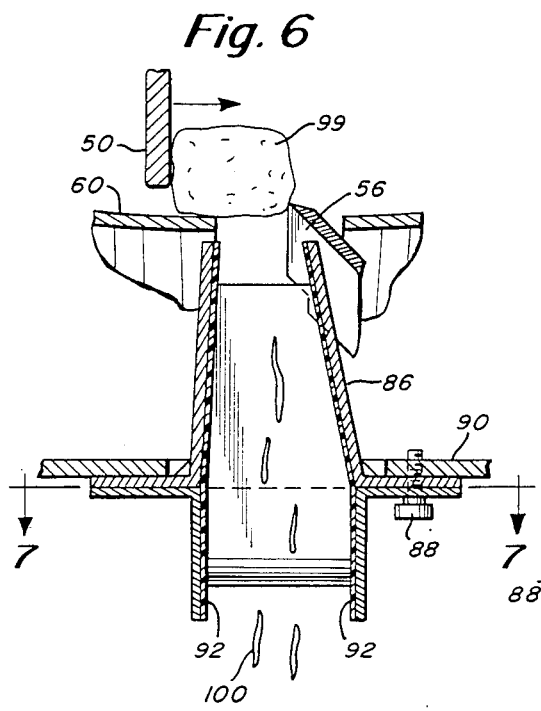
FIG. 6 is an exaggerated cross-sectional view of the shaving mechanism of the instant apparatus, as seen along line 6—6 of FIG. 5.

The lower front portion of the ice-shaver machine has been modified in order to permit mounting of the blender and mechanical connection of the units. The discharge port of the ice-shaver machine has been modified by the addition of spout extension 16 (see FIG. 5), which serves to direct the shaved ice into blender cup 18. And the original cover of the machine has been replaced by a bin 20, secured at its base to the top of ice-shaver machine 12, and having removable lid 22, to hold considerably more ice cubes or crushed ice than the machine as originally designed. Bin 20 and lid 22 are preferably made of plexiglass.

Shaved ice from machine 12 is delivered through spout extension 16 to blender cup 18 positioned therebeneath. Cup 18 is a conventional glass or plastic blender cup that holds the drink mixture to be blended. A suitable blender unit for use in the present invention is Hamilton Beach model 908 blender.

Momentary push button switch 24 is the on-off switch for the apparatus, two-position toggle switch 26 permits a choice between a small drink and a large drink, and push-button switch 28 serves to re-set the shaver motor, all as more fully explained below. Knob 30 permits adjustment of the position of shaver blade 56 (FIG. 2) to adjust the thickness of the shaved ice delivered by machine 12.

Screws 36 permit removal of the top or cover of machine 12, to allow access to its working parts. Handles 34 (one of which is shown in FIG. 1) permit machine 12 to be readily transported, and also have ventilation holes 35 communicating with the interior of machine 12.

Enclosure 40, which includes perforated sheet metal deck 42 and underlying deck plate 44 (FIG. 4), completely encloses the blender motor 48 (FIG. 3) to protect it from spillage and other moisture. The rear portion 46 of enclosure 40 serves as a base for ice shaver machine 12 and houses the timing mechanism 80 and other electrical circuitry. Plate 38 has been affixed by screws 39 at the modified lower front of the ice-shaving machine 12 to seal it off from moisture and spillage.

Figure 2:
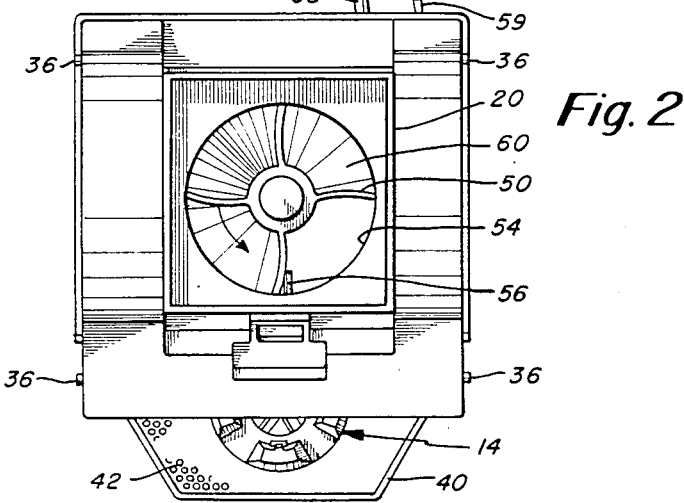
FIG. 2 is a top plan view of the apparatus of FIG. 1, but with the top cover and blender cup removed.
Figure 3:
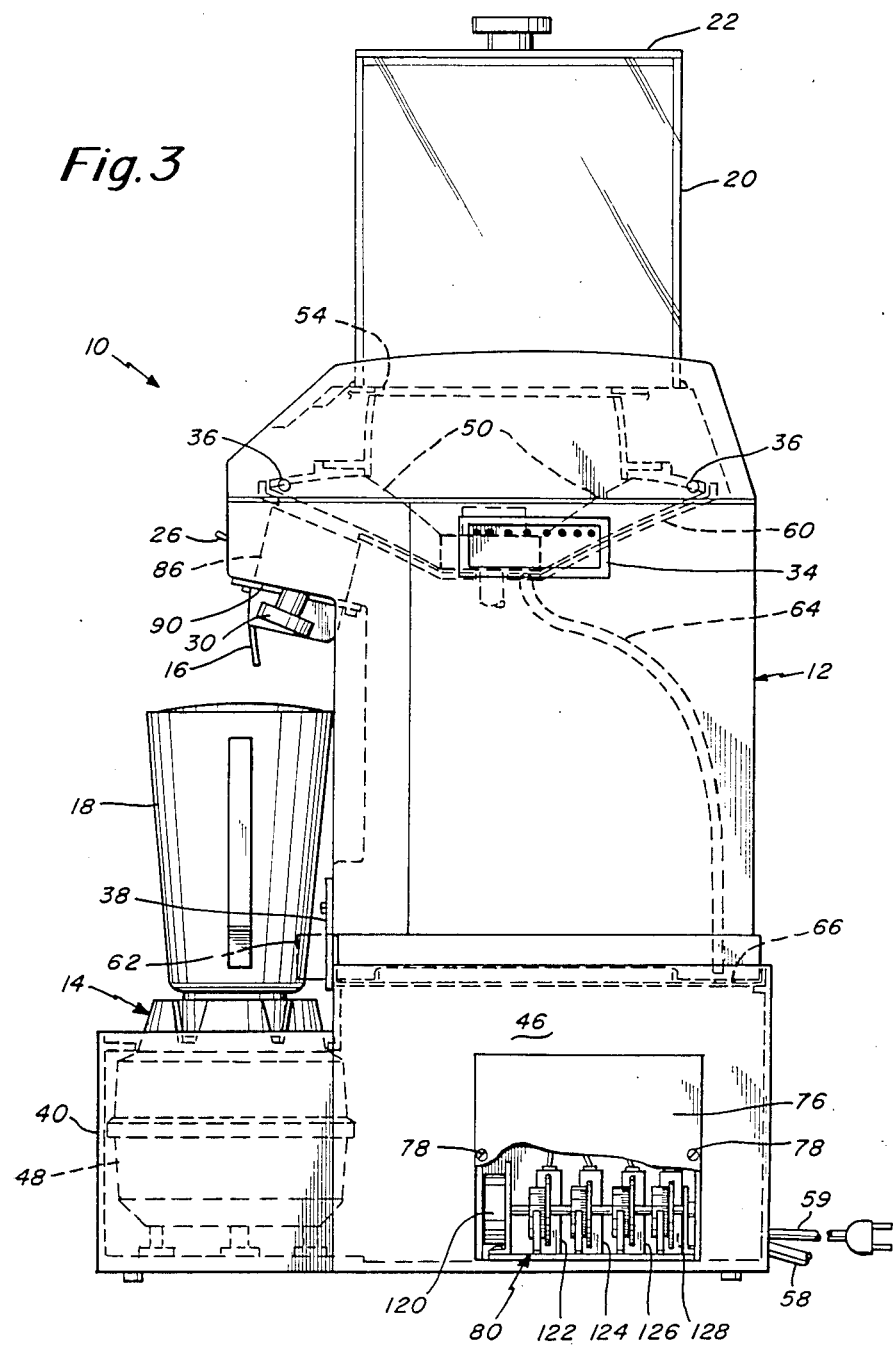
FIG. 3 is a side view of the apparatus, partly in phantom, showing the arrangement of the blender motor, the ice-shaving mechanism, and the programmable timing means.

In FIG. 2, bin 20 and cover 22 have been removed in order to view spinner blades 50 of ice-shaving machine 12, which blades are located in a conical recess 60 near the top of machine 12 (see FIG. 3). Spinner blades 50 move in a counter-clockwise direction and serve to push the ice cubes or crushed ice introduced through opening 54, against shaver blade 56, causing the ice to be finely shaved. Outlet drainage hose 58 and power cord 59 can be seen exiting from the rear of the apparatus.

As seen in FIG. 3, blades 50 are rotatably mounted in conical recess 60, the spinning of blades 50 causing the ice, via centrifugal force, to move to the upper part of recess 60, where shaver blade 56 is located (FIG. 2).

Figure 4:
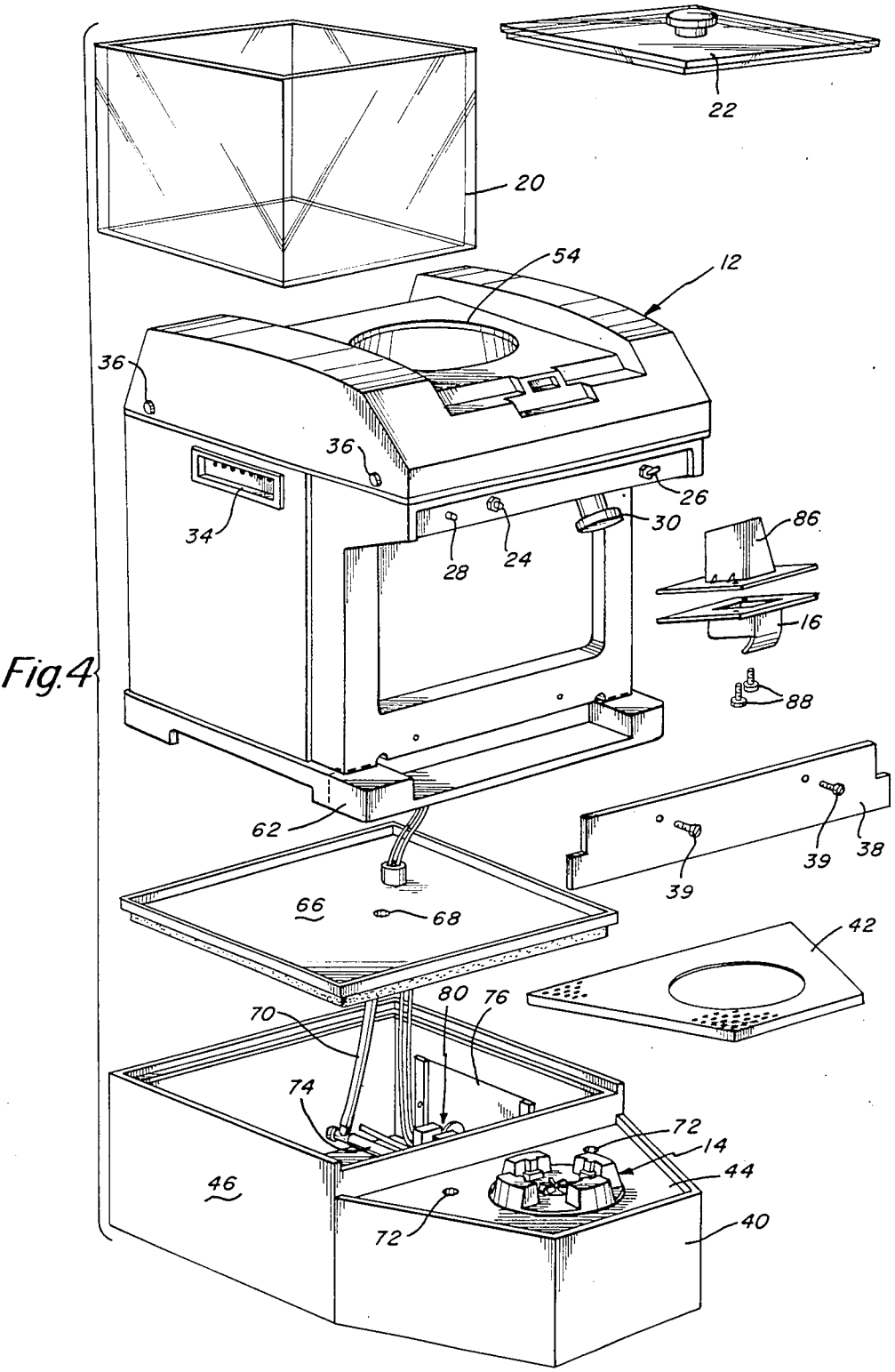
FIG. 4 is an exploded perspective view of the components of the apparatus.

In FIG. 3 and FIG. 4 can be seen the small portion 62 of the lower front of ice-shaving machine 12 that has been removed in order to construct apparatus 10. Plate 38 is then affixed, preferably by screws 39, to the modified lower front portion.

As seen in FIG. 3, the ice-shaving machine 12 is provided with drainage hose 64 which drains the base of recess 60, and delivers the drained water to drip tray 66 (FIG. 4), which in turn drains through drain hole 68 and hose 70. Y-shaped drainage hose 74 drains off liquid from deck plate 44 (FIGS. 4 and 8) through drain holes 72, hoses 70 and 74 being joined within the rear portion 46 of enclosure 40, and delivering drained liquid to outlet drainage hose 58.

Programmable timer 80 (FIG. 3) is accessible at the side of rear portion 46 of enclosure 40 via cover 76 which is preferably affixed by screws 78.

Figure 7:
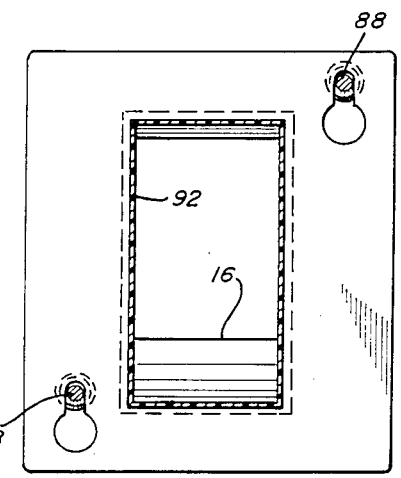
FIG. 7 is a plan view (partly in section) of the discharge port of the apparatus as seen along the line 7—7 of FIG. 6.

The mechanism for delivery of the shaved ice to the blender cup is shown in detail in FIGS. 4 and 5-7. The spout mechanism is comprised of two parts: original spout 86 and added spout extension 16 which is affixed to original spout 86 and to the underside 90 of the upper front of ice shaver machine 12 by screws 88. Spinner blades 50 push ice cubes 99 into contact with shaver blade 56, producing ice shavings 100 which, directed by spout extension 16, drop into the blender cup. Teflon tape 92 has been added to the interior of spout sections 86 and 16 to facilitate delivery of the ice shavings 100. As seen in FIG. 7, spout extension 16 may be readily removed via loosening of screws 88.

Figure 8:
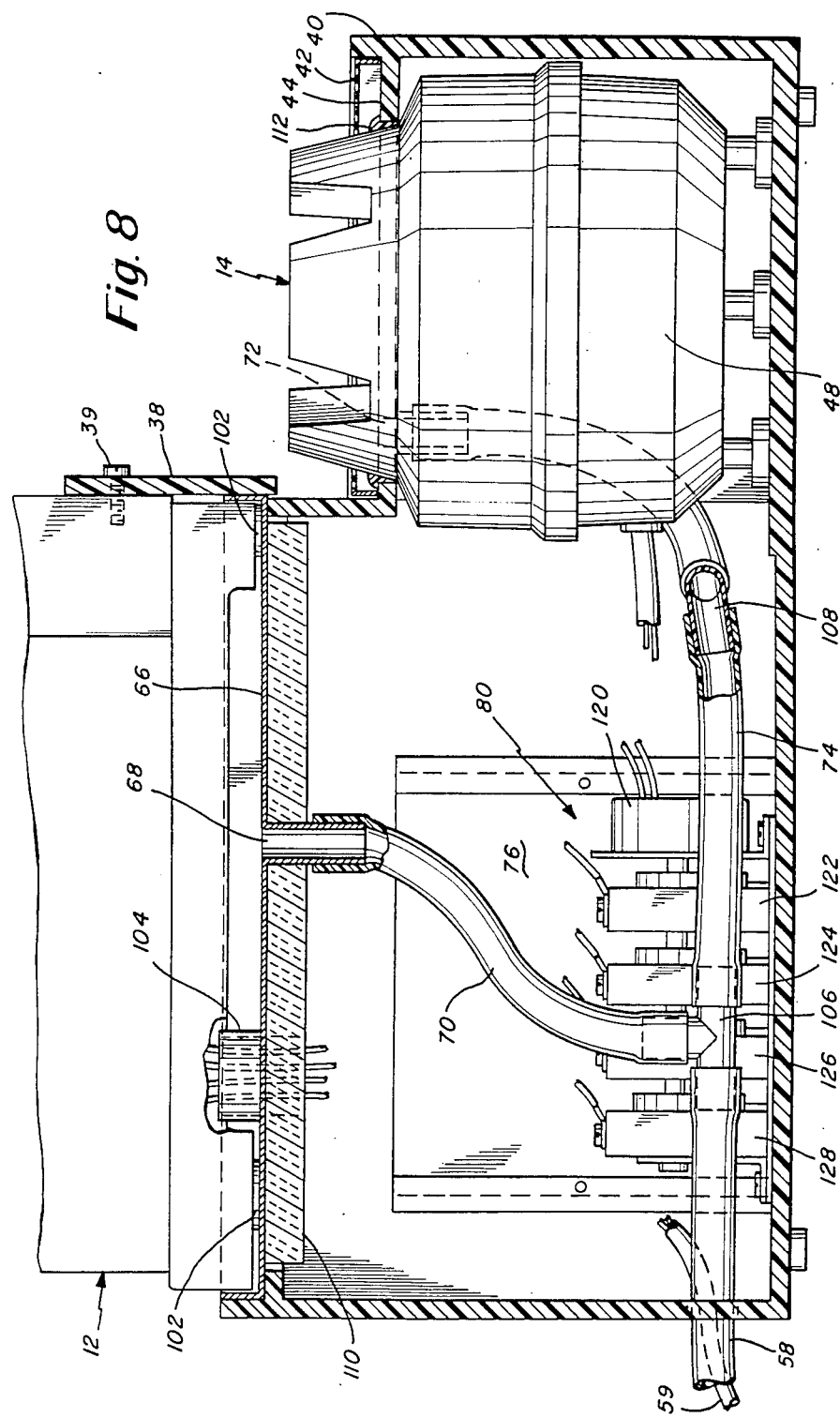
FIG. 8 is a partial sectional view of the arrangement of the blender motor, drainage hoses, and timing means, as seen along the line 8—8 of FIG. 1.

Turning to FIG. 8, the feet 102 of ice-shaving machine 12 rest on drip tray 66. Wire tunnel 104 protects the electrical leads from machine 12 and permits connection to the circuitry of the apparatus. T-junction 106 connects hoses 70 and 74 to outlet drainage hose 58. T-junction 108 forms part of Y-shaped drainage hose 74. A layer of insulation 110 is provided below drip tray 66 to protect the electrical circuitry housed within enclosure 40. Silicone caulk 112 seals the upper portion of the blender motor 48 at drainage deck 44.

Programmable timing means 80 preferably comprises a standard 4-gang sequencer, such as Model 03 TM Series Time/Module Repeat Cycle Timer, sold by Eagle Signal Industrial Controls, 736 Federal Street, Davenport, Iowa 52803, which includes timer motor 120 that operates four camming mechanisms 122, 124, 126, and 128. (See FIG. 3). Each camming mechanism includes a cam that is programmable so as to operate a respective microswitch for a chosen period of time. Upon operation of start button 24, motor 120 rotates the four cams simultaneously through one rotation. In the preferred embodiment here described, a complete rotation of the cams occurs in fifteen seconds. It has been determined that blender 14 should preferably start operation about three seconds after ice shaving machine 12 begins to deliver shaved ice. Ice should be delivered for about 4-6 seconds (for a small drink) and the blender 14 should operate for 7-8 seconds. These values are programmed into timing means 80 by means of tabs selectively located on the outer perimeter of each cam wheel of camming mechanisms 122, 124, 126, and 128 to trigger their respective microswitches for the chosen sequencing. Of course, other devices might be employed for sequential timing of the various steps here described.

Furthermore, various adjustments could be made to the program, such as eliminating the delay between start of the blender motor and the start of ice delivery. In some applications such a delay might not be necessary.

Figure 9:
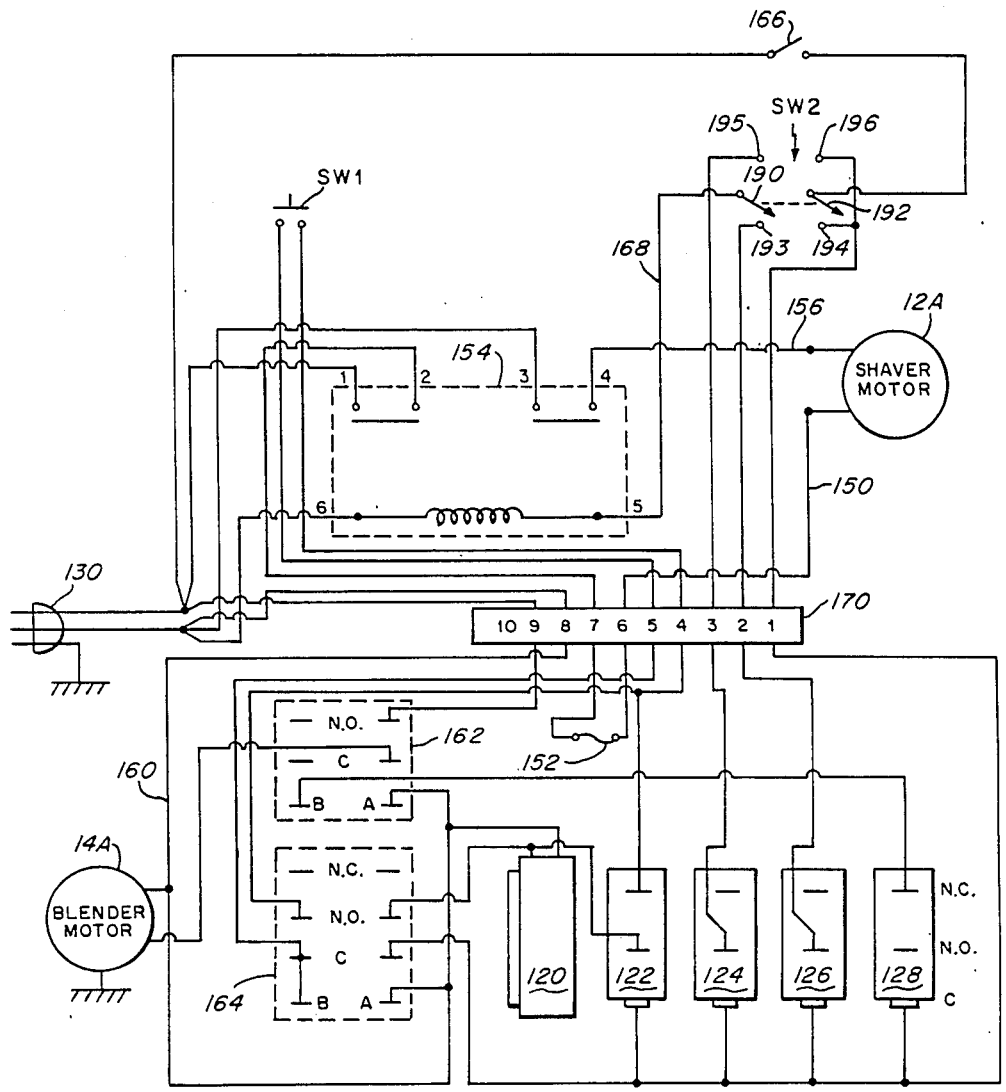
FIG. 9 is an electrical wiring diagram showing the combined wiring of the blender and the ice-shaver, controlled by the programmable timing means.

FIG. 9 is an electrical wiring diagram of the circuitry that permits interconnection of the shaver and the blender, and programmable operation of the apparatus. Specifically, both the ice machine and the blender are powered from the normal 120 volt main 130. The motor 12A of ice shaving machine 12 is connected to the power source on one side via lead 150, through circuit breaker 152 and relay 154, and on the other side via lead 156 through relay 154. Circuit breaker 152 corresponds to push-button switch 28 of FIG. 1, and serves to permit turning off the shaver motor when and if ice becomes jammed in the shaver. Double pole, double throw, center off switch SW2 controls the timing and length of operation of the shaver motor by controlling relay 154; in a first position, with switch arms 190 and 192 in contact with terminals 193 and 194, respectively, connection is made to relay 154 via lead 168 through camming mechanism 126, while in a second position, with switch arms 190 and 192 in contact with terminals 195 and 196, respectively, connection is made through camming mechanism 124. The motor 14A of blender 14 is connected to the power source 130 on one side via lead 160, and on the other through relay 162 via camming mechanism 128. Thus camming mechanism 128 controls the timing and length of operation of the motor of blender 14. Ten-position connector 170 facilitates interconnection of the ice shaver and the blender units.

Operation of the apparatus proceeds as follows. After the desired drink ingredients have been placed in blender cup 18, the apparatus is activated by pressing momentary switch 24 (FIG. 1), which corresponds to switch SW1 of FIG. 9. Through relay 164, this starts motor 120 of the 4-gang sequencer, and the four camming mechanisms begin turning. Ice-shaver 12 preferably immediately commences operation, the length of time it operates being determined by the position of toggle switch 26 (FIG. 1), which corresponds to switch SW2 of FIG. 9. Switch SW2 thus determines the size of the drink being made. As described above, in a first position, ice is delivered until camming mechanism 126 turns off the ice-shaver motor; in the other, camming mechanism 124 controls the ice-shaver. Thus with camming mechanisms 126 and 124 programmed for two different amounts of time, the position of toggle switch 26 (FIG. 1) provides a convenient choice of either of two different size drinks (e.g., small and large). Obviously, by replacing switch 26 with a switch having more positions, and by incorporating a larger sequencer, one could provide for a number of drink sizes.

Camming mechanism 128 turns on and then turns off blender motor 14 as desired, while camming mechanism 122 turns off the timer motor after one revolution of the camming mechanisms.

Thus it can be seen that, by appropriate settings of camming mechanisms 124, 126, and 128, and of toggle switch 26, the sequencing of the ice delivery and the blender operation can be pre-programmed so that an operator need only push momentary switch 26 to effect operation of the apparatus and to prepare a frozen drink of desired size.

For safety purposes, switch 166 opens to disable the motor of ice shaver 12 when the lid 22 of bin 20 is opened.

Although only one illustrative embodiment has been disclosed, other changes and modifications will be immediately apparent to those skilled in the art. For example, additional circuity could be provided to allow the blender to be operated independently of the timer mechanism if, say, additional blending were desired after the apparatus had completed its cycle.

What is claimed is:

1. An apparatus for preparing frozen drinks comprising in combination:
   means for preparing and delivering finely-divided ice,
   a blender having a blender cup for receiving said ice, and
   timing control means connected to said ice preparation means and to said blender for automatically controlling the commencement and amount of ice delivery, and the commencement and duration of blending during operation of the apparatus.

2. The apparatus of claim 1, wherein said timing control means includes means for starting said blender after a pre-selected amount of time has elapsed after commencement of the delivery of ice to the blender cup.

3. The apparatus of claim 2, wherein said timing control means further comprises means for pre-selecting the amount of ice to be delivered to the blender cup by selecting the amount of time during which the ice preparation means will operate.

4. The apparatus of claim 1, wherein said timing control means further comprises means for pre-selecting the amount of ice to be delivered to the blender cup by selecting the amount of time during which the ice preparation means will operate.

5. The apparatus of claim 1, wherein said timing control means includes programming means for pre-selecting the sequencing of the commencement and cessation of ice delivery and the commencement and cessation of the operation of the blender.

6. The apparatus of claim 1, further comprising a drain deck located above the motor of said blender, said drain deck fitting tightly to said motor.

7. The apparatus of claim 6, further comprising a perforated panel located directly above said drain deck.

8. The apparatus of claim 7, further comprising at least one drain hose communicating with said drain deck for draining moisture from said deck.

* * * * *

(12) REEXAMINATION CERTIFICATE (4333rd)

United States Patent
Herbert

(10) Number: US 4,681,030 C1
(45) Certificate Issued: May 8, 2001

(54) APPARATUS FOR PREPARING FROZEN DRINKS

(75) Inventor: John M. Herbert, Norwood, MA (US)

(73) Assignee: HMC of Massachusetts Limited Partnership, Walpole, MA (US)

Reexamination Request:
No. 90/004,267, Jun. 7, 1996

Reexamination Certificate for:
Patent No.: 4,681,030
Issued: Jul. 21, 1987
Appl. No.: 06/831,656
Filed: Feb. 20, 1986

(51) Int. Cl.$^7$ ............................... A23G 9/00; B01F 15/06
(52) U.S. Cl. ................ 99/484; 62/331; 99/486; 366/144; 366/601
(58) Field of Search ............................... 99/275, 280, 290, 99/323.7, 357, 468, 484–486; 62/320, 331, 342; 241/101.6, 101.8, DIG. 17; 366/144, 205, 314, 601; 426/249; 222/640

(56) References Cited

U.S. PATENT DOCUMENTS

| | | |
|---|---|---|
| 565,794 | * 8/1896 | Raubold . |
| 770,357 | * 9/1904 | Dewberry . |
| 1,337,955 | * 4/1920 | Punzelt . |
| 1,442,945 | * 1/1923 | Hauk . |
| 1,606,992 | * 11/1926 | Gilchrist . |
| 1,641,699 | * 9/1927 | Smith . |
| 1,764,337 | * 6/1930 | Nielsen . |
| 1,938,880 | * 12/1933 | White . |

(List continued on next page.)

FOREIGN PATENT DOCUMENTS

| | | | |
|---|---|---|---|
| 480406 | * 4/1976 | (AU) . | |
| 2319067 | * 10/1974 | (DE) . | |
| 2815610 | * 10/1979 | (DE) . | |
| 2226963 | * 11/1974 | (FR) | ................ 241/101.8 |
| 2278254 | * 2/1976 | (FR) . | |
| 2374001 | * 7/1978 | (FR) . | |

59-98654 * 6/1984 (JP) .

OTHER PUBLICATIONS

"Dial–a–Freeze+Dial–a–Shake", *Vending Engineer*, Sep.–Oct. 1965, vol. 4, No. 6.*
"Selftimer Blendor®", Waring Commercial, Cat. No. 7015N, 1985.*
Japanese Utility Model Public Disclosure No. 1884/1977.*
Japanese Utility Model Public Disclosure No. 129382/1982.*
*Industrial Controls Catalog, Bulletin 345, TM Series Modular Timer*, Eagle Signal Industrial Controls A Division of Gulf–Western Manufacturing Company, Dec. 1981.*
*Vend* magazine, Oct. 15, 1964, pp. 34 and 35.*
Advertisement, "Timer masterminds new 'Dial–a–Shake' vendor".*
"Dial–a–Shake" service manual, Model 450–1A, Nimco Inc., Spring Valley, Illinois, twenty–eight pages.*
*Vending Engineer* magazine, Sep./Oct. 1965 issue, forty–eight pages.*
Advertising flier, "Dial–a–flavor", undated, one page.*
Advertising flier, "NEW!", dial a shake corporation, undated, two pages.*
Letter signed by Roy Fitzer, Vice President, Dial–a–shake, Inc., two pages.*

*Primary Examiner*—Stephen F. Gerrity

(57) ABSTRACT

An apparatus for preparing frozen drinks, in which an ice-shaving machine is combined with a blender in a single unit, the output of the ice-shaving machine being discharged directly into the blender cup. The ice-shaver and the blender are electrically wired together, and programmable timing means are provided to permit selective control of the periods of time over which the ice-shaver and blender operate, so that, by the momentary activation of a single switch button, the apparatus may be activated and will automatically deliver the appropriate amount of ice to the blender cup and will turn on the blender at the appropriate time and for the appropriate amount of time.

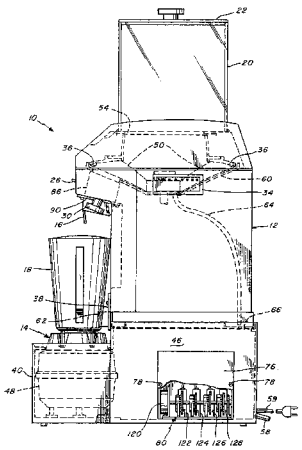

U.S. PATENT DOCUMENTS

| | | | |
|---|---|---|---|
| 2,143,202 | * | 1/1939 | Martinet . |
| 2,263,794 | * | 11/1941 | Wyen . |
| 2,585,822 | * | 2/1952 | Myers . |
| 2,724,949 | * | 11/1955 | Kattis . |
| 2,775,877 | * | 1/1957 | Bruntjen . |
| 2,800,152 | * | 7/1957 | Sloier ................................... 99/275 |
| 2,905,449 | * | 9/1959 | Belk et al. . |
| 3,086,563 | * | 4/1963 | Patten et al. . |
| 3,156,103 | * | 11/1964 | Ross . |
| 3,196,628 | * | 7/1965 | Reynolds ............................. 62/320 |
| 3,276,633 | * | 10/1966 | Rahauser . |
| 3,279,205 | * | 10/1966 | Stoelting . |
| 3,297,061 | * | 1/1967 | Nimee . |
| 3,311,353 | * | 3/1967 | Rogenski . |
| 3,335,911 | * | 8/1967 | Stutz . |
| 3,338,153 | * | 8/1967 | Holstein et al. ..................... 99/275 |
| 3,379,416 | * | 4/1968 | Smader et al. . |
| 3,428,218 | * | 2/1969 | Coja . |
| 3,441,176 | * | 4/1969 | Reynolds et al. . |
| 3,548,280 | * | 12/1970 | Cockroft . |
| 3,568,887 | * | 3/1971 | Jacobs et al. . |
| 3,589,626 | * | 6/1971 | Saurer . |
| 3,618,733 | * | 11/1971 | Winsett . |
| 3,638,392 | * | 2/1972 | Welker, Jr. et al. . |
| 3,671,020 | * | 6/1972 | Krup . |
| 3,702,666 | * | 11/1972 | Stano . |
| 3,715,119 | * | 2/1973 | Shelley et al. . |
| 3,799,459 | * | 3/1974 | Bakewell ......................... 241/101.6 |
| 3,837,587 | * | 9/1974 | Walter et al. . |
| 3,913,343 | * | 10/1975 | Rowland et al. . |
| 4,008,883 | * | 2/1977 | Zubieta . |
| 4,055,099 | * | 10/1977 | Mitsubayashi ............... 241/DIG. 17 |
| 4,123,918 | * | 11/1978 | Kohl et al. . |
| 4,174,742 | * | 11/1979 | Murphey . |
| 4,189,063 | * | 2/1980 | Matthiesen . |
| 4,201,558 | * | 5/1980 | Schwitters et al. . |
| 4,275,567 | * | 6/1981 | Schwitters . |
| 4,276,750 | * | 7/1981 | Kawasumi ............................. 62/320 |
| 4,319,698 | * | 3/1982 | Tomiyama et al. . |
| 4,324,494 | * | 4/1982 | Pryor et al. . |
| 4,351,612 | * | 9/1982 | Valbona et al. . |
| 4,450,692 | * | 5/1984 | Sharpe et al. . |
| 4,517,651 | * | 5/1985 | Kawasaki et al. . |
| 4,528,824 | * | 7/1985 | Herbert . |
| 4,538,509 | * | 9/1985 | Ojima et al. . |
| 4,551,025 | * | 11/1985 | Ames et al. . |
| 4,595,131 | * | 6/1986 | Ruskin et al. . |
| 4,613,086 | * | 9/1986 | Granum et al. ................... 241/101.8 |
| 4,625,525 | * | 12/1986 | Bradbury et al. . |
| 4,653,281 | * | 3/1987 | Van Der Veer . |

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, lines 3–9:

Thus it can be seen that, by appropriate settings of camming mechanisms 124, 126, and 128, and of toggle switch 26, the sequencing of the ice delivery and the blender operation can be pre-programmed so that an operator need only push momentary switch [26] *24* to effect operation of the apparatus and to prepare a frozen drink of desired size.

AS A RESULT OF REEXAMINATION, IT HAS BEEN DETERMINED THAT:

The patentability of claims 1–8 is confirmed.

New claims 9 and 10 are added and determined to be patentable.

*9. An apparatus for preparing frozen drinks comprising in combination:*

*means for preparing and delivering finely-divided ice,*

*a blender having a blender cup for receiving said ice, and*

*timing control means connected to said ice preparation means and to said blender for automatically controlling the commencement and amount of ice delivery and the commencement and duration of blending during operation of the apparatus,*

*said timing control means further comprising programming means for pre-selecting, prior to the commencement of each operation of the apparatus, the amount of ice to be delivered during that operation.*

*10. The apparatus of claim 9, wherein said programming means comprises means for pre-selecting the amount of time during which the ice preparation means will operate.*

* * * * *